2,962,515

POLYMER PHOSPHORIC ESTER ANTI-ENZYMATIC SUBSTANCES

Egon Richard Diczfalusy, Stockholm, and Ove Birger Fernö, Knut Bertil Högberg, and Torsten Ove Enok Linderot, Halsingborg, Sweden, and Ernst Thomas Rosenberg, Orholm Pr. Lyngby, Denmark, assignors to Aktiebolaget Leo, Halsingborg, Sweden, a firm No Drawing. Filed Nov. 27, 1950, Ser. No. 197,842

Claims priority, application Sweden Nov. 30, 1949

7 Claims. (Cl. 260—461)

The present invention relates to the manufacture of substances having increased anti-enzymatic effect on alkaline phosphatase and hyaluronidase and to the new compounds themselves.

Various substances showing such an anti-enzymatic effect are already known, and others have been developed in connection with the research work on which the present invention is based. Thus heparin, sulphonated hyaluronic acid, rutin, quercetin, ascorbic acid, phloretin and some other substances have anti-hyaluronidase effect, while heparin, ascorbic acid, oestrone phosphate, phloretin and others have anti-phosphatase effect, particularly on alkaline phosphatase.

We have found that the anti-hyaluronidase and anti-phosphatase effect in most cases are interconnected. The effect of the above named and similar substances is, however, weak.

We have further found that in a certain group of substances, which comprises some of the above named ones, it is possible to increase the anti-enzymatic effect strongly by phosphorylation. In most cases the effect is increased by about 100–10000 times by phosphorylation. That the increased effect of the organic phosphates thereby obtained which were hitherto unknown cannot be ascribed to their increased solubility in water is proved by the fact that the phosphorylated substances are more effective than the unphosphorylated ones, even in concentrations in which the unphosphorylated substances are water-soluble.

One object of the present invention is therefore to procure new compounds which are phosphates of at least one of a group of substances each of which contains at least one phenolic hydroxyl group and is selected from the group consisting of substances having one of the configurations, which will be more closely defined below and which are closely interrelated.

Other objects of the present invention are to procure new phosphorus-containing reaction products of each of a number of known substances specified below and phosphorus oxychloride soluble in water or at least in dilute alkali.

A still further object of the invention is to procure a method of producing compounds having increased anti-enzymatic effect against the above named enzymes which method comprises the dissolution of a substance belonging to the well defined group referred to above in a solvent capable of promoting phosphorylation by a phosphorylating agent such as phosphorus oxychloride, adding the phosphorylating agent in question with or without further addition of phosphorylation promoting agents, leaving the reaction mixture thus formed to stand until the desired degree of phosphorylation has taken place, and hydrolyzing the reaction product.

Other objects and purposes of the invention will appear from the following detailed description, it being understood that we are not limited to the exact conditions and proportions stated, obvious alterations therein being included in our invention.

Generally good results are obtained by phosphorylating substances containing at least one phenolic hydroxyl group and having one of the following general formulae:

1.

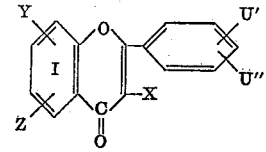

2.

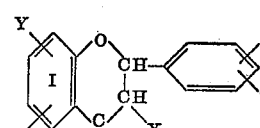

3.

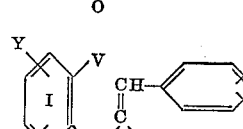

4.

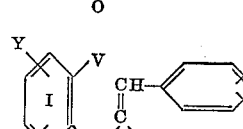

wherein X represents a residue selected from the group consisting of the hydrogen atom and the hydroxyl group, Z, Y, U', and U'' represent a residue selected from the group consisting of hydroxyl, acyloxy, alkyloxy and hydrogen, provided that only one of the symbols Z and Y and only one of the symbols U' and U'' may represent hydrogen, and V represents a residue selected from the group consisting of hydroxyl, acyloxy and alkyloxy.

It will be seen that the configurations mentioned represent derivatives of flavone, flavanone, chalcone and dihydrochalcone respectively. In the Formulae 3 and 4 V always represents either hydroxyl, acyloxy or alkyloxy, which make the substances represented by these formulae closely related to the substances represented by the Formulae 1 and 2, since it is well known that by treating a chalcone derivative, having a hydroxyl group in the ortho position to the carbon atom of the aromatic ring I connected to the ketone group, with acid, the corresponding flavanone derivative is formed. In an alkaline solution this reaction may be reversed. Thus by the treatment of hesperetin with alkali the isomeric 3,2',4',6'-tetrahydroxy-4-methoxy-chalcone is obtained and this compound by treatment with acid is changed into hesperetin.

Various alkoxy groups have been tried and found satisfactory, for instance methoxy, ethoxy. Similarly there have been tried a number of different acyl groups, such as benzoyl and carboalkoxy such as carbobenzoxy.

Thus according to the invention highly increased anti-phosphatase and anti-hyaluronidase effects are obtained with the phosphorylation product of the dihydro derivative of 4,2',4',6'-tetrahydroxychalcone, i.e. phloretin. Further, in order to mention specific examples of the compounds stated above, very satisfactory increase in the inhibitory effect on alkaline phosphatase and hyaluronidase is obtained with phosphorylation products of quercetin, naringenin, hesperetin, apigenin, 4,2',4',6'-tetrahydroxychalcone, 4,2',4'-trihydroxychalcone, 3,2',4',6-tetrahydroxy-4-methoxy-chalcone, 4,2',4'-trihydroxy- 3-methoxy-chalcone and 4-methylphlorein, and 2'-methyl-phloretin.

As an example of the effect which may be obtained through the present invention we may mention that phloretin has a recognizable inhibitory effect in vitro on alkaline phosphatase in the concentration 0.03 mg. per ml., but not in smaller concentrations, whereas the phosphorylation product of phloretin is still effective in the same manner in the concentration 0.00003 mg. per ml. On hyaluronidase phloretin is active in the concentration 0.3 mg./ml., but not in smaller concentrations, while the phosphorylated compound inhibits the enzymatic effect in the concentration 0.00003 mg./ml. At a concentration of 0.003 mg. per ml. a total inhibition of the enzymatic effect is obtained. The other compounds prepared according to the invention show a correspondingly increased effect.

When the compounds which are to be phosphorylated contain only one free phenolic hydroxyl group (i.e. in the case that other hydroxyl groups, if present, are covered by substitution with for instance an alkyl or an acyl group) it is assumed that the phosphorylated compounds are monoesters. If more than one free hydroxyl group is present during the phosphorylation, this or these may also participate in the phosphorylation reaction. Further, it is assumed that in many cases a condensation takes place as a result of one phosphoric acid group reacting with more than one of the hydroxy-groups. In accordance with this assumption it has been found that the phosphorylation according to the present invention in many cases yields more or less high-molecular products. This is especially the case in the event that the compound which is to be phosphorylated contains at least three reactive phenolic hydroxyl groups. Generally, the strongest enzyme-inhibiting effect is obtained with high-molecular phosphorylation compounds. Using the same organic compound and the same phosphorylating agents it is possible to obtain phosphorylated products possessing different molecular size, breaking the reaction at various intervals. The longer the reaction is allowed to proceed the higher the enzyme-inhibiting effect appears to be, provided, however, that the phosphorylation product is still soluble in water and/or dilute alkali. It is, however, possible to extend the reaction so far that the product becomes not only difficultly soluble or insoluble in water, but also insoluble in dilute alkali. The useful phosphorylated compounds according to the invention are soluble in water or dilute alkali. Variations in molecular size and solubility in water and/or dilute alkali can also be caused by varying the solvent used during the phosphorylation or by changing the sequence of admixture or by changing the amount of phosphorylating agents used. It is supposed that these possibilities of variations are caused by the different activity of the hydroxyl group under different conditions.

Normally the phosphorylated compounds according to the invention are insoluble in organic solvents such as alcohol, acetone and anhydrous ethyl ether, although certain exceptions occur as it appears from the following specific examples. The compounds obtained contain about 6–12 percent phosphorus.

In the case that phosphorylation products of too great a molecular size have been obtained, they may be split again by hydrolysis to form soluble products.

In the following examples the anti-enzymatic effects on alkaline phosphatase have been determined by measuring a kidney phosphatase preparation on sodium phenyl phosphate in the presence of the substances in question. The anti-hyaluronidase effects are determined by testing the action of the substances in question on hyaluronidase by a viscosimetric method.

*Example 1*

1.4 parts of phloretin are dissolved in 10 parts of anhydrous pyridine. At −10° C. to −15° C. a solution of 0.8 part of phosphorus oxychloride in 5 parts of anhydrous pyridine is slowly added. After 5–10 minutes at −10° C. to −15° C. the reaction mixture begins to become turbid and viscous. After one more minute it is hydrolyzed with finely crushed ice, whereby a clear solution is obtained, which contains a crude phosphorylation product of phloretin. This crude product might be purified in different ways:

(a) The solution, which contains the crude phosphorylation product, is acidified by addition of hydrochloric acid, whereby an oil is precipitated. The oil is separated from the water phase and washed with acetone and ether. The residue is dissolved in aqueous sodium bicarbonate, and to the resulting solution hydrochloric acid is added, whereby a solid product is obtained.

(b) The solution obtained by hydrolysis, and which contains the crude phosphorylation product, is evaporated in vacuo, whereupon the main part of pyridine is removed by treatment with dilute hydrochloric acid. The semi-solid residue is treated with a saturated aqueous sodium bicarbonate solution, whereby poly-phloretin-phosphate is dissolved. The solution obtained is extracted with ether, whereupon dilute hydrochloric acid is added causing the precipitation of a semi solid product. This is first treated with acetone and then with ether, whereby a solid product results.

The solid product obtained either by the purification according to a or b is a poly-phloretinphosphate, a colorless substance, easily soluble in aqueous bicarbonate, relatively soluble in water, insoluble in anhydrous ethanol, acetone and ether. It shows a distinct inhibition as to hyaluronidase and alkaline phosphatase in concentrations of 0.00003 mg. per ml.

*Example 2*

0.7 part of 4,2',4',6'-tetrahydroxy-chalcone is dissolved in 5 parts of anhydrous pyridine. The solution is cooled to −10° C. to −15° C., and a solution of 0.4 part of phosphorus oxychloride in 5 parts of anhydrous pyridine is slowly added. After 5 minutes at −10° C. to −15° C. the solution begins to become turbid, and after 10 more minutes a redbrown precipitate is formed. The reaction mixture is now hydrolyzed with finely crushed ice, whereby a solution is obtained, which contains a crude phosphorylation product of 4,2,',4',6'-tetra-hydroxy-chalcone. This crude product might be purified in different ways:

(a) The solution is acidified by addition of hydrochloric acid, whereby an oil is precipitated. The oil is separated from the water phase and washed with acetone and ether. The residue is dissolved in aqueous sodium bicarbonate, and to the solution obtained hydrochloric acid is added, whereby a solid product is obtained.

(b) The solution is evaporated in vacuo, whereupon the main part of pyridine is removed by treatment with dilute hydrochloric acid. The semi solid residue obtained is treated with a saturated aqueous sodium bicarbonate solution, whereby poly-4,2',4',6'-tetrahydroxy-chalcone-phosphate is dissolved. The solution obtained is extracted with ether, whereupon dilute hydrochloric acid is added causing the precipitation of a semisolid product. This is first treated with acetone and then with ether, whereby a solid product is obtained.

The solid product obtained either by the purification according to a or b is a poly-4,2',4',6'-tetrahydroxy-chalcone-phosphate, an orange colored substance, soluble in water and aqueous bicarbonate, insoluble in anhydrous ethanol, acetone and ether. It shows a distinct inhibition as to hyaluronidase and alkaline phosphatase in concentrations of 0.00005 mg. per ml.

*Example 3*

1.5 parts of hesperetin are dissolved in 10 parts of anhydrous pyridine. At −10° C. to −15° C. a solution of 0.8 part of phosphorus oxychloride in 5 parts of anhydrous pyridine is slowly added. After 5–10 minutes at −10° C. to −15° C. the reaction mixture begins to become turbid and viscous. After one more minute it is hydrolyzed with finely crushed ice, whereby a clear solution is obtained, which contains a crude phosphorylation product of hesperetin. This crude product might be purified in different ways:

(a) The solution is acidified by addition of hydrochloric acid, whereby an oil is precipitated. The oil is separated from the water phase and washed with acetone and ether. The residue is dissolved in aqueous sodium bicarbonate, and to the solution hydrochloric acid is added, whereby a solid product is obtained.

(b) The solution is evaporated in vacuo, whereupon the main part of the pyridine is removed by treatment with dilute hydrochloric acid. The semi solid residue is treated with a saturated aqueous sodium bicarbonate solution, whereby poly-hesperetin-phosphate is dissolved. The solution obtained is extracted with ether, whereupon dilute hydrochloric acid is added to the remaining aqueous phase causing the precipitation of a semi solid product. This is treated first with acetone and then with ether, whereby a solid product is obtained.

The solid product obtained either by the purification according to a or b is a polyhesperetin-phosphate. It is a colorless substance, easily soluble in aqueous bicarbonate, slightly soluble in water and insoluble in ethanol, acetone and ether. It shows a distinct inhibition as to hyaluronidase and alkaline phosphatase in concentrations of 0.001 mg. per ml.

Example 4

1.3 parts of 4,2′,4′-trihydroxy-chalcone are dissolved in 10 parts of anhydrous pyridine. At −10° C. to −15° C. a solution of 0.8 part of phosphorus oxychloride in 5 parts of anhydrous pyridine is slowly added. After 5 minutes at −10° C. the solution begins to become turbid. After 5–10 more minutes a redbrown precipitate is formed. The reaction mixture is now hydrolyzed with finely crushed ice. The solution obtained hereby is evaporated in vacuo, and the main part of pyridine is removed from the residue by treatment with dilute hydrochloric acid. The semi solid residue is treated with a saturated aqueous sodium bicarbonate solution, and the solution obtained is extracted with ether. To the aqueous phase dilute hydrochloric acid is added causing the precipitation of a semi solid product, which is treated first with acetone and then with ether, whereby a solid product is obtained. It is a poly-4,2′,4′-trihydroxychalcone-phosphate, redbrown in color, soluble in water, very soluble in aqueous bicarbonate and insoluble in anhydrous ethanol, acetone and ether. It shows a distinct inhibition as to hyaluronidase and alkaline phosphatase in concentrations of 0.0005 mg. per ml.

Example 5

1.5 parts of quercetin are dissolved in 10 parts of anhydrous pyridine. At −10° C. to −15° C. a solution of 0.8 part phosphorus oxychloride in 5 parts of anhydrous pyridine is slowly added. After 15 minutes at −10° C. to −15° C. the reaction mixture begins to become turbid, and 5 minutes later a yellowish brown precipitate is formed. The reaction mixture is now hydrolyzed with finely crushed ice, whereby a solution is obtained. The poly-quercetin-phosphate may be precipitated by addition of dilute hydrochloric acid to the aqueous solution, but the following method is preferable.

The solution obtained by the hydrolysis is evaporated in vacuo, and the residue is treated with dilute hydrochloric acid. A yellow powder is obtained which is dissolved in dilute sodium hydroxide. The solution is extracted several times with ether and afterwards precipitated with dilute hydrochloric acid. The thus obtained product is a poly-quercetin-phosphate, a yellow substance, easily soluble in aqueous bicarbonate, relatively soluble in water and insoluble in anhydrous ethanol, acetone and ether. It shows a distinct inhibition as to hyaluronidase and alkaline phosphatase in concentrations of 0.001 mg. per ml.

Example 6

2.74 parts of phloretin are dissolved in 20 parts of anhydrous pyridine. At −10° C. a solution of 0.8 part of phosphorus oxychloride in 10 parts of anhydrous pyridine is slowly added. After about 2 hours the solution begins to become turbid, and 15 minutes later a viscous precipitate is formed. Hereafter the reaction mixture is hydrolyzed with finely crushed ice. The solution obtained is evaporated in vacuo, and the remaining oil is treated with dilute hydrochloric acid. Thereby a solid colorless substance is obtained, which is filtered off and dried. Possibly remaining non reacted phloretin is removed from the solid substance by treating first with acetone and subsequently with ether. The residue is a poly-phloretin-phosphate, easily soluble in water and aqueous bicarbonate, insoluble in anhydrous ethanol, acetone and ether. It shows a distinct inhibition as to hyaluronidase and alkaline phosphatase in concentrations of 0.00002 mg. per ml.

Example 7

2.74 parts of phloretin are dissolved in 30 parts of anhydrous quinoline. At −10° C. a solution of 0.8 part of phosphorus oxychloride in 5 parts anhydrous quinoline is slowly added. The temperature of the reaction mixture is gradually raised to and kept at 20° C. for 2 hours. Hereafter the reaction mixture is cooled again to −10° C. and a solution of 1.6 parts of phosphorus oxychloride in 5 parts of anhydrous quinoline is slowly added. After this the temperature of the reaction mixture is again raised to and kept at 20° C. until the reaction mixture begins to become semi solid. This takes about one hour.

The reaction mixture is cooled again to −10° C. and is hydrolyzed with finely crushed ice, whereby a solution is obtained. The solution is alkalized to pH 11 by addition of dilute aqueous sodium hydroxide, whereupon the quinoline is removed by a repeated extraction with a mixture of acetone-ether (1:3). To the remaining aqueous phase dilute hydrochloric acid is added, whereby a light brown precipitate is formed. The product obtained is a poly-phloretin-phosphate, soluble in dilute aqueous alkalis, slightly soluble in water and aqueous bicarbonate and insoluble in anhydrous ethanol, acetone and ether. The product shows a distinct inhibition as to hyaluronidase and alkaline phosphatase in concentrations of 0.00001 mg. per ml.

Example 8

1 part of naringenin is dissolved in 10 parts of anhydrous pyridine. At −10° C. a solution of 0.6 part of phosphorus oxychloride in 5 parts of anhydrous pyridine is slowly added. After half an hour the solution begins to become turbid. After 5 more minutes the reaction mixture is hydrolyzed with finely crushed ice, whereby a solution is obtained. The solution is evaporated in vacuo, whereupon the main part of the pyridine is removed by treatment with dilute hydrochloric acid. The semi solid residue is treated with a saturated aqueous sodium bicarbonate solution, whereby poly-naringenin-phosphate is dissolved. The solution obtained is extracted with ether, whereupon dilute hydrochloric acid is added to the remaining aqueous phase causing the precipitation of a semi solid product. This is treated first with acetone and then with ether, whereby a solid product, a poly-naringenin-phosphate is obtained. It is a colorless substance, easily soluble in aqueous bicarbonate, slightly soluble in water and insoluble in anhydrous ethanol, acetone and ether. It shows a distinct inhibition as to hyaluronidase and alkaline phosphatase in concentrations of 0.001 mg. per ml.

Example 9

1.1 parts of 3,2',4',6'-tetrahydroxy-4-methoxy-chalcone are dissolved in 10 parts of anhydrous pyridine. At —10° C. a solution of 0.6 part of phosphorus oxychloride in 5 parts of anhydrous pyridine is slowly added. After 5 minutes at —10° C. the solution begins to become turbid. After 10 more minutes a redbrown precipitate is formed. The reaction mixture is now hydrolyzed with finely crushed ice, whereby a solution is obtained. This is evaporated in vacuo, whereupon the main part of the pyridine is removed from the residue by treatment with dilute hydrochloric acid. The residue is now semi solid and contains a poly-3,2',4',6'-tetra-hydroxy-4-methoxy-chalcone-phosphate, which is dissolved by treatment with a saturated aqueous sodium bicarbonate solution. The solution obtained is extracted with ether, whereupon dilute hydrochloric acid is added to the remaining aqueous phase causing the precipitation of a semi solid product. This is treated first with acetone and then with ether, whereby a solid product, a poly-3,2',4',6'-tetrahydroxy-4-methoxy-chalcone-phosphate, is obtained. It is a redbrown substance, very soluble in aqueous bicarbonate, soluble in water and insoluble in anhydrous ethanol, acetone and ether. It shows a distinct inhibition as to hyaluronidase and alkaline phosphatase in concentrations of 0.00005 mg. per ml.

Example 10

1 part of 4,2',4'-trihydroxy-3-methoxy-chalcone is dissolved in 10 parts of anhydrous pyridine. At —10° C. a solution of 0.6 part of phosphorus oxychloride in 5 parts of anhydrous pyridine is slowly added. After 5 minutes at —10° C. the solution begins to become turbid. After 10 more minutes a redbrown precipitate is formed. The reaction mixture is now hydrolyzed with finely crushed ice, whereby a solution is obtained. This is evaporated in vacuo, whereupon the main part of the pyridine is removed from the residue by treatment with dilute hydrochloric acid. The residue is now semi solid and contains a poly-4,2',4'-trihydroxy-3-methoxy-chalcone phosphate, which is dissolved by treatment with a saturated aqueous sodium bicarbonate solution. The solution obtained is extracted with ether, whereupon dilute hydrochloric acid is added to the remaining aqueous phase causing the precipitation of a semi solid product. This is treated first with acetone and then with ether, whereby a solid product, a poly-4,2',4'-trihydroxy-3-methoxy-chalcone-phosphate is obtained. It is a red substance, soluble in water, very soluble in aqueous bicarbonate and insoluble in anhydrous ethanol, acetone and ether. It shows a distinct inhibition as to hyaluronidase and alkaline phosphatase in concentrations of 0.0005 mg. per ml.

Example 11

1 part of 2'-methyl-phloretin is dissolved in 10 parts of anhydrous pyridine. At —10° C. a solution of 0.6 part of phosphorus oxychloride in 5 parts of anhydrous pyridine is slowly added. After 15 minutes at —10° C. a crystalline precipitate of pyridinium chloride is formed. The temperature is gradually raised to and kept at 20° C. for 15 minutes. Thereupon the solution becomes turbid, and the precipitate changes into a viscous lump. The reaction mixture is hydrolyzed with finely crushed ice. A clear solution is not immediately formed, but the voluminous precipitate gradually dissolves. The solution is then evaporated in vacuo, whereafter the residue is treated with dilute hydrochloric acid. A colorless substance is thus obtained. This is separated from the liquid and dissolved in aqueous bicarbonate. The solution obtained is extracted several times with ether, and afterwards hydrochloric acid is added causing the precipitation of a colorless product. This product is a poly-2'-methyl-phloretin-phosphate, soluble in aqueous bicarbonate and insoluble in anhydrous ethanol, acetone and ether. It shows a distinct inhibition as to hyaluronidase and alkaline phosphatase in concentrations of 0.00005 mg. per ml.

Example 12

1 part of 4-methyl-phloretin is dissolved in 10 parts of anhydrous pyridine. At —10° C. a solution of 0.6 part of phosphorus oxychloride in 5 parts of anhydrous pyridine is slowly added. After 15 minutes at —10° C. a crystalline precipitate of pyridinium chloride is formed. The temperature is gradually raised to and kept at 20° C. for 15 minutes. Thereupon the solution becomes turbid, and the precipitate changes into a viscous lump. The reaction mixture is hydrolyzed with finely crushed ice. A clear solution is not immediately formed, but the voluminous precipitate gradually dissolves. The solution is then evaporated in vacuo whereafter the residue is treated with dilute hydrochloric acid. A colorless substance is thus obtained. This is separated from the liquid and dissolved in aqueous bicarbonate. The solution obtained is extracted several times with ether, and afterwards hydrochloric acid is added causing the precipitation of a colorless product. This product is a poly-4-methyl-phloretin-phosphate, soluble in aqueous bicarbonate and insoluble in anhydrous ethanol, acetone and ether. It shows a distinct inhibition as to hyaluronidase and alkaline phosphatase in concentrations of 0.00005 mg. per ml.

What we claim is:

1. A poly-phloretin-phosphate being a colorless substance, easily soluble in aqueous bicarbonate, relatively soluble in water, insoluble in anhydrous ethanol, acetone and ether, containing from 6 to 12 percent phosphorus and showing distinct inhibition as to hyaluronidase and alkaline phosphatase in concentrations of 0.00003 mg./ml.

2. The method of producing a compound having increased anti-enzymatic effect against alkaline phosphatase and hyaluronidase which consists essentially in phosphorylating phloretin with phosphorus oxychloride in an anhydrous solvent selected from the group consisting of pyridin and quinolin at a temperature of from about —10° C. to +20° C. in the ratio of parts by weight of from 1.4 to 2.74 of phloretin to 0.8 of oxychloride until a product soluble in water and aqueous bicarbonate is obtained.

3. A poly-heterocyclic phosphate selected from the group consisting of poly-phloretin-phosphate, poly-methylphloretin-phosphate, poly-quercetin-phosphate, poly-naringenin-phosphate, and poly-hesperetin-phosphate, being a colorless substance, easily soluble in aqueous bicarbonate, relatively soluble in water, insoluble in anhydrous ethanol, acetone and ether, containing from about 6 to 12 percent phosphorus and showing distinct inhibition as to hyaluronidase and alkaline phosphatase in concentrations of 0.00003 mg./ml. for poly-phloretin-phosphate, of 0.00005 mg./ml. for poly-methylphloretin-phosphate, and of 0.001 mg./ml. for poly-quercetin-phosphate, poly-naringenin-phosphate and poly-hesperetin-phosphate.

4. The phosphate as set forth in claim 3 which is poly-quercetin-phosphate.

5. The phosphate as set forth in claim 3 which is poly-naringenin-phosphate.

6. The phosphate as set forth in claim 3 which is poly-hesperetin-phosphate.

7. The phosphate as set forth in claim 3 which is poly-methylphloretin-phosphate.

References Cited in the file of this patent

UNITED STATES PATENTS 2,465,320   Bergel et al. _____ Mar. 22, 1949

OTHER REFERENCES

Dahl: Chem. Abstracts, vol. 33, page 6364 (1939).
The Merck Index—5th edition, page 427 (1940).